May 1, 1934.   G. WALMSLEY   1,956,840
WELDING MACHINE
Filed Aug. 1, 1929   2 Sheets-Sheet 1

INVENTOR.
GEORGE WALMSLEY.
BY
ATTORNEY.

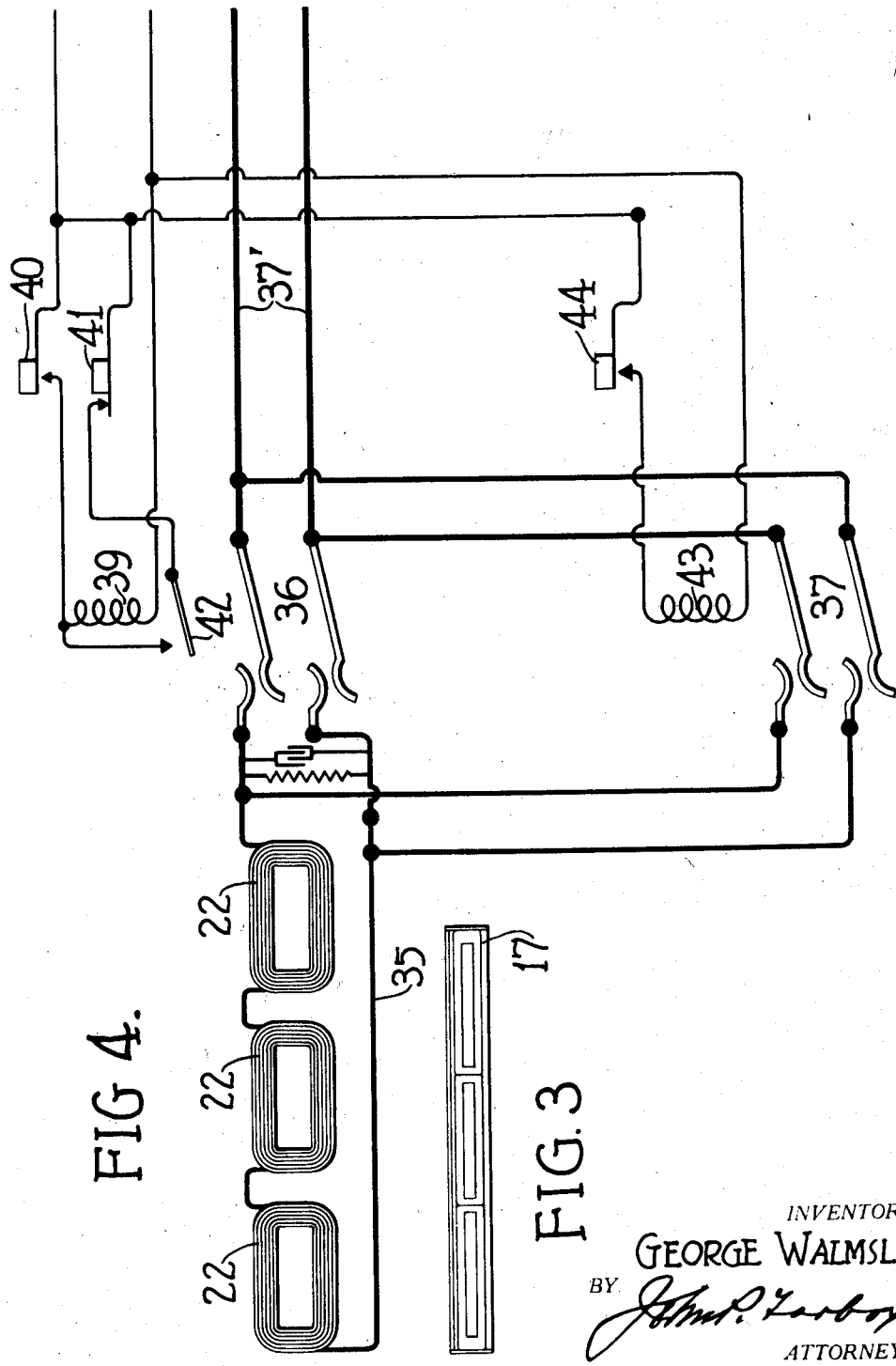

Patented May 1, 1934

1,956,840

UNITED STATES PATENT OFFICE 1,956,840

WELDING MACHINE

George Walmsley, Philadelphia, Pa., assignor to Edward G. Budd Manufacturing Company, Philadelphia, Pa., a corporation of Pennsylvania Application August 1, 1929, Serial No. 382,693

13 Claims. (Cl. 219—17)

The welding machine in which my invention is shown embodied is a flash welding machine intended for the welding together of relatively long and narrow sheets of material into relatively long and wide sheets. The invention has been actually embodied in such a machine and has proven itself a thing of great utility. This is because first and foremost it enables the flat sheet stock to be clamped in position with the great pressure and rigidity necessary for application of the final welding pressures without changing the flat form of the sheet or altering its unbroken plane surface in any way. Ordinarily, mechanical clamps are used in such machines together with positioning pins and abutments which engage co-acting walls especially formed on the sheet stock or stampings. None of these are required when my invention is made use of to clamp the work.

But my invention is of utility also for a second reason. The electromagnetic clamp is built right into the die supporting structure and, in fact, may constitute the supporting structure and perhaps even the die structure itself. It carries but one principal moving part, to wit, its armature, whereas mechanical clamps carry many moving parts. So built in, it is simple and rugged in construction, and occupies a minimum of space and can be most easily operated through the opening and closing of electric switches.

On top of this a machine embodying it presents a very clean, ship-shape appearance free from overhead complexities or encumbrances of mechanism. By reason of this freedom alone, it is easier to clean and to operate and to observe, and by reason of this freedom, coupled with the essential mechanical simplicity of the electromagnetic clamp, it is cheaper to construct, to operate and to maintain.

But while I show my invention in this particular embodiment and have thus far actually constructed only such an embodiment, there is no doubt but what my invention is capable of numerous other embodiments in which its utility may be realized in degrees even greater than those set forth.

My invention consists in combining with the welding die and electromagnetic work holding clamp. In a flash welding machine there are usually two welding dies opposed to each other. I utilize an electromagnetic welding clamp in connection with each of them. I adjoin the welding dies with beds of magnetic material, set the energizing windings of the clamp in said material, arrange the engaging faces of the die and the clamp substantially in the same plane, provide an armature separated from the bed or main body of the clamp by the work itself and engaging the work in spaced regions one juxtaposed to the die and the other to the main body of the clamp, but intermediately separated from the work, and independently supply welding current to the die and energizing current to the winding through separately controlled circuits.

Of the drawings—

Figure 3 is a plan view of the work engaging face of a connected die and work clamp, and Figure 4 is a diagram of the electrical connections of the work holding clamp.

Figures 1, 2:
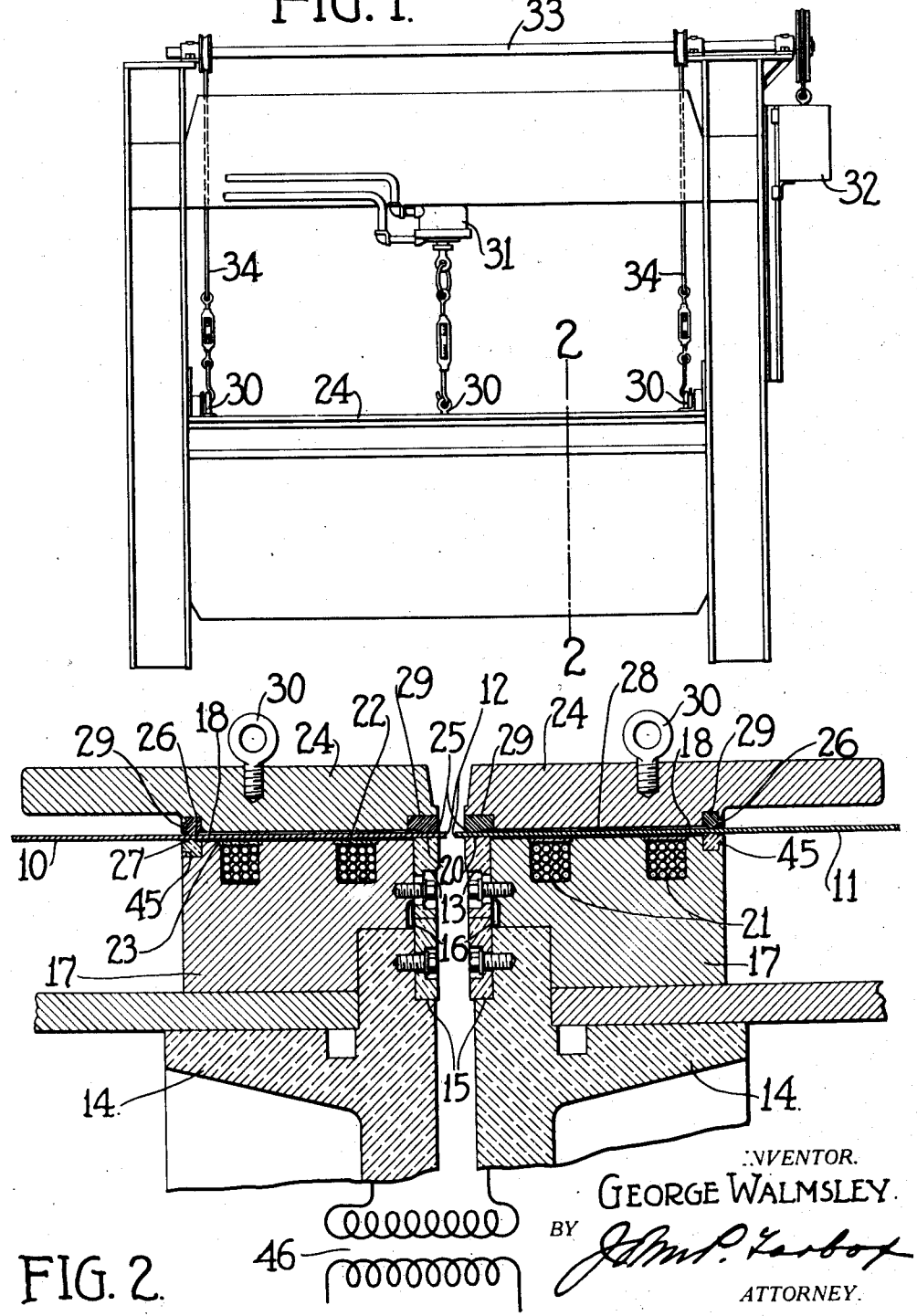
Figure 1 is a front elevation showing in general outline a welding machine in which my invention is embodied.
Figure 2 is a transverse section on line 2—2.

In Figure 2 appear two relatively narrow sheets of flat sheet stock 10 and 11 to be flash welded together by their adjacent edges 12. 13 are opposed welding dies of non-magnetic and highly conductive material such as bronze through which welding current is to be conducted to the edges 12 of the sheets to be welded together. The sheets 10 and 11 are very long. Their edges are rectilinear. So also the opposed welding dies 13 are rectilinear and elongated co-extensively with the sheets 10 and 11. The welding dies and with them the sheets 10 and 11, which are held thereon by the means of my invention, are movable toward and from each other in the operations of the machine by the movement of the massive co-extensive frames of conducting material, preferably non-magnetic. The means for moving these frames toward and from each other are not shown as they are not of my invention but any suitable means may be utilized. Reference may be made for such means if desired to the copending application of Arthur F. Hanson filed August 8, 1929, Serial No. 384,430 for Flash welding machine, since matured into Patent No. 1,879,217 dated Sept. 27, 1932. Suffice it to say that dies 13 are rigidly connected with the frames 14 by seating in the rabbets 15 and bolting on. Welding current is supplied the dies 13 by a transformer diagrammatically illustrated at 46.

According to my invention, I mount rigidly on the frames 14 immediately adjoining the dies 13, beds 17 of magnetic material, and like the dies, rectilinear and elongated in form as appears in Fig. 3. They may be rigidly secured in place by any desired means as by bolts (not shown). The upper faces of these beds 18 I constitute work engaging faces, and locate them substantially in the same plane as the work engaging faces 20 of the dies 13, but the faces 20 of the dies may if desired be a few thousandths higher than the faces 18 as shown. But preferably they are really in the same plane. In the faces 18 are formed winding receiving pockets 21 in which magnetizing windings 22 are set. These windings, in the form illustrated, are three in number, elongated in form and disposed in series along the length of the rectilinear beds 17. Their thickness is less than the depths of the pockets 21 and the remaining depth is filled flush with the surface 18 by continuous bands of conducting material 23 which bands form closed electric circuits. They are preferably made of copper. Their functioin is to set up a counter electro-motive force which will cut down the amount of arcing at the switch utilized to break the circuits of windings 22.

Overlying the main bodies of the clamps constituted by the beds 17 and windings 22 and also overlying the dies 20 are armatures 24 for the clamps. These armatures, like the dies 13 and the bed 17, are rectilinear and elongated as appears clearly from Figs. 1 and 2. They are comprised of magnetic material. They engage the work in restricted areas, the one 25 juxtaposed to the work engaging area of the dies 13 and the other 26 juxtaposed to the opposite margin 27 of the main body of the clamp. Intermediately the armatures 24 are separated from the work pieces 10 and 11 and also from the beds 17 by relatively small air gaps 28 of the order of a few thousandths of an inch, though it is shown considerably exaggerated in Fig. 2. In the restricted areas 25—26 of work engagement, the armatures 24 effect the engagement through inserts 29 of material having a greater co-efficient of friction with the work pieces 10 and 11 and perhaps better wearing characteristics than the magnetic material of the body of armatures 24.

The armatures 24 are separated from the main bodies 17 of the clamps by the work pieces 10 and 11 themselves. Moreover, they are bodily translatable toward and from the work pieces 10 and 11 and the main body 17 of the clamp by means of the hoisting mechanism connected with the screw eyes 30. The motor for this hoisting mechanism is the fluid pressure cylinder 31 shown in Fig. 1 as connected with the central screw eye 30. Counter weights 32 acting through the common overhead shaft 33 and connections 34 to the screw eyes 30 at opposite ends of armatures 24, assist motor 31 in its operation and maintain armatures 24 in raised or removed positions. The adjustment is such that when motor 31 is relieved of fluid pressure, gravity acts upon the armature 24 sufficiently in excess of the action of the counter weights 32, to replace armatures 24, whereas when the fluid pressure is applied, armatures 24 are removed.

As clearly appears in Fig. 4, each main body 17 is provided with three windings 22 set into its work engaging face. These three windings are connected electrically and in series in the energizing circuit 35. This circuit is reversibly controlled through reversing circuit breakers 36 and 37 which close it reversely to the power mains 37. Circuit breaker 36 is the cut-on and cut-off circuit breaker serving to energize and de-energize the electro-magnetic clamp. Circuit breaker 37 is the de-energizing circuit breaker the function of which is to reverse the current in windings 22 and reversely energize these coils sufficiently to de-magnetize the clamp destroying residual magnetism to that degree to permit sheets 10 and 11 to be readily removed. Circuit breaker 36 is actuated by coil 39 energizable and de-energizable respectively by push buttons 40 and 41. When push button 40 is down, coil 39 is energized and pulls circuit breaker 36 and closes a locking contact 42 through button 41 which is normally closed. The magnetizing circuit therefore remains closed until button 41 is pressed, thereby opening the locking circuit by way of contact 42. Circuit breaker 37 is operated by coil 43 contrclled by the push button 44.

The operation is readily followed. The electromagnetic clamps being de-energized and armatures 24 being in raised position, sheets 10 and 11 are introduced by moving them laterally over the beds 17 into proper juxtaposed position to the dies 13 and to each other as shown in Fig. 2. Preferably, both sheets are introduced from the same side of the machine, the one passing under both armatures 24, and the other under the near armature only. Being adjustable in position by means not shown, armatures 24 are lowered into place by release of fluid pressure from motor 31. They engage the work in the regions 25 and 26, the one juxtaposed to dies 13 and the other to the opposite margin of the main body 17 of the clamp. The engagement is within the restricted area and by material having a relatively high co-efficient of friction with the work but preferably magnetic material whereby high concentration of magnetic force may be had at these points. Inserts 45 similar to inserts 29 may be provided in the main bodies 17 juxtaposed to the inserts 29. Button 40 is pushed, circuit breaker 36 is closed, the lock closed through contacts 42. Immediately the electromagnetic clamp bites hard down upon sheets 10 and 11 in the restricted areas 25 and 26 and firmly and rigidly clamps the sheets in place without marring them or changing their configuration in any way. Thereupon the dies 13 are approached toward each other by a movement of the frames 14 and the welding action takes place under the current supplied from the transformer 46 which is diagrammatically illustrated. This current, as shown, passes through the frames 14 of conducting material through the dies 13 of conducting material and likewise through the main body 17 of the electromagnetic clamps, partly through the concentrated contacts effected in the regions 25 and 26 with the work, and from one piece 10 of the work to the other 11. The flash takes place between the edges 12 of the material. The welding current is duly cut off by means not shown. But the movement of approach of frames 14 continues and the weld is effected. It is at this moment of movement forcing the fused margins 12 together that the greatest clamping force is required. My machine provides this with full effectiveness, permitting no slippage whatever under this extremely high pressure of final movement. Engagements in this spaced areas 25—26 co-act to produce this result.

Movement of frames 14 is stopped immediately the fused parts have been properly pushed together, thereupon circuit breaker 36 is opened by pushing button 41 and circuit breaker 37 immediately thereafter closed by push button 44 momentarily reversing the current in the coils 22 (through any appropriate resistance), de-magnetizing the clamp sufficiently to free armatures 24 and the work pieces 10 and 11 of residual magnetism which may interfere with their removal. Motor 31 is energized raising the armatures 24. Thereupon the work pieces 10 and 11 may be slid between the bed 17 and the armatures 24 and removed from the machine to make way for new work.

If desired, the gap 18 beneath the work 10 and 11 may be eliminated and that above the work and between it and armatures 24 only retained. In such event I propose that the conducting winding covers 23 and the top 18 of bed 17 lie in a common plane with the top of the die 13 and to commonly engage the work. The work itself is thereby held down upon the bed by the magnetic action of circuits, since the sheets are usually of iron or steel. Furthermore, in such event, the welding current is passed to the work not only through the dies 13 and the marginally removed work engaging areas 24, but also through the work engaging faces of bed 17 in entirety and the work engaging faces of the covering rings 23. But there is very great augmentation in the holding action of the clamp by confining the work engagement of the armature to the restricted areas 25—26.

The dies 13 are cooled by the passage of water through conduits 16 shown in Fig. 2.

Obviously the greatly elongated forms of the clamp are especially adapted to the present embodiment and there may be many other forms given these clamps depending upon the conditions under which they are to be used. Many, if not all of these, may be modifications of my invention. So too, modifications may arise by reason of other considerations of various natures. Each and all of them partake of the generic spirit of my invention and should be protected to me in the annexed claims.

What I claim as new and useful and desire to protect by Letters Patent is:—

1. In a welding machine for welding large flat sheets of metal edge to edge, opposed approachable and separable welding dies, and an electromagnetic work holding clamp on each die.

2. In a sheet metal flash welding machine for welding large flat sheets of metal edge to edge, opposed approachable and separable welding dies, and electromagnetic sheet holding clamps in connection with each die arranged to exert a substantially uniform clamping action on the sheet co-extensive with its surface.

3. In a welding machine, a welding die of non-magnetic material, an adjoining bed of magnetic material, which die and bed have work engaging faces substantially in the same plane and magnetizing windings set in said bed of magnetic material.

4. In a welding machine, a welding die of non-magnetic material, an adjoining bed of magnetic material, magnetizing windings embodied in said bed of magnetic material, and a welding circuit including commonly said die and said bed of magnetic material, the said die and bed each having work engaging faces.

5. In a welding machine, a welding die and an electromagnetic work holding clamp co-acting therewith having an armature which engages the work in spaced regions one juxtaposed to the die and another juxtaposed to the main body of the electromagnetic clamp removed from the die.

6. In a welding machine, a rectilinear welding die, a rectilinear electromagnetic work holding clamp in the rear of the die having an armature overlying both the die and the main body of the clamp, which armature engages the work along the die and also along the margin of the main body of the clamp, but is intermediately spaced from the work.

7. In a welding machine, a welding die, an electromagnetic work holding clamp in connection therewith having an armature of a face area juxtaposed to the main body of the clamp substantially equal to the work engaging face area of the main body, but itself engaging the work in a greatly reduced area as compared with the main body.

8. In a welding machine, a welding die, an electromagnetic work holding clamp in connection therewith having an armature of a face area juxtaposed to the main body of the clamp substantially equal to the work engaging face area of the main body, but itself engaging the work in a greatly reduced area as compared with the main body, and furthermore engaging the work through a material having a relatively higher coefficient of friction with the work than the material of the body of the armature.

9. In a welding machine, a welding die, an electromagnetic work holding clamp, and energizing and de-magnetizing circuits for the clamp.

10. In a welding machine for welding large flat sheets of metal edge to edge, a welding die of conducting material movable during welding, together with an electromagnetic clamp co-acting therewith carried by and bodily movable together with the die.

11. In a welding machine for welding large flat sheets of metal edge to edge, a welding die of conducting material movable during welding, together with an electromagnetic clamp co-acting therewith carried by and bodily movable together with the die together with independent welding and clamp energizing circuits therefor.

12. In a welding machine, a rectilinear welding die, a rectilinear adjoining bed of magnetic material, which die and bed have work engaging faces substantially in the same plane, magnetizing windings set in said bed along its length, a rectilinear armature overlying both the die and the bed and engaging the work along the die and along the opposed margin of the bed, but intermediately spaced from the work, together with independent welding die and magnetizing winding circuits.

13. In a resistance welding machine for welding large flat sheets of metal edge to edge, the combination of relatively movable work carrying members, magnet windings adjacent the work holding surfaces of said members, work holding clamps translatable to and from said work holding members and magnetically directed thereto by said magnet windings, means for energizing and de-magnetizing said windings, and means associated with said windings comprising closed conducting loops for counter-acting the inductive effect of said windings, whereby to facilitate the energization and de-magnetization of said windings.

GEORGE WALMSLEY.